May 31, 1927.

F. H. SMITH 1,630,676

COOKING DEVICE

Filed Jan. 17, 1927

Inventor
F. H. Smith,

By Clarence A O'Brien
Attorney

May 31, 1927.

F. H. SMITH 1,630,676

COOKING DEVICE

Filed Jan. 17, 1927

Inventor
F. H. Smith

By Clarence A O'Brien
Attorney

Patented May 31, 1927.

1,630,676

UNITED STATES PATENT OFFICE.

FREDERICK HOBSON SMITH, OF DOVER, NEW HAMPSHIRE.

COOKING DEVICE.

Application filed January 17, 1927. Serial No. 161,587.

This invention relates to new and useful improvements in cooking devices, and has for its primary object to provide a mechanism including generally a container for water, grease, or other material within which the food is to be cooked and to have a plurality of baskets mounted for alternative submersion within the material and so operated as to remain for sufficient length of time within the material so as to become properly cooked, other means being provided to convey the food within one of the other baskets simultaneously with the movement of the first mentioned basket into the heated material with the result in view of providing a device wherein food may be automatically cooked without requiring the continuous attention of an operator.

A further and important object is to provide a device of this character that is relatively speaking, simple of construction, inexpensive of manufacture and operation and one that is well adapted for the cooking of food, nuts, and the like in a simple and untedious manner.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views.

Figure 3:
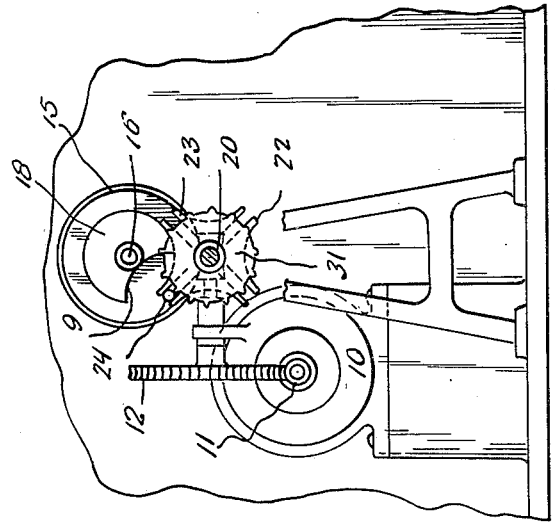
Figure 3 is a section taken substantially upon the line 3—3 of Figure 2.

Now having particular reference to the drawings my novel device consists of a suitable casing 5, one side of the front wall of which is provided with glass panels 6—6, while resting upon the bottom wall of this casing directly in back of the lower glass panel 6 is a cooked food receptacle 7. Mounted within this casing 5 at the side of the receptacle 7 is the cooking mechanism per se which includes a water or grease trough 8 mounted upon the bottom wall of the casing and being of curvilinear formation as clearly disclosed in Figure 1. Any suitable means may be provided for heating the water or grease within this trough, there being disclosed an electrical heater 9 arranged within the base thereof. Suitably supported in back of this trough 8 and extending slightly thereabove is an electric motor 10, the armature shaft of which is equipped at its forward end with a worm 11 having mesh with a large worm gear 12 mounted upon one end of a suitably journaled stub shaft 13 above the armature shaft of the motor, see Figures 2 and 3. The inner end of this stub shaft 13 is equipped with a worm 14 that has mesh with a large worm gear 15 upon a shaft 16 suitably journaled between a pair of vertical supporting standards 17—17. The forward face of this worm gear 15 is equipped with a smaller annulus 18 that is formed at its periphery with a crescent shaped cut out 19.

Suitably journaled beneath the shaft 16 is a parallel shaft 20 that terminates at its forward end slightly above the trough 8 and is equipped at this end with a large circular plate 21. Upon this shaft 20 directly in front of the worm gear 15 and beneath the periphery of the annulus 18 is a star wheel 22 formed with four slots 23 that terminate at their inner ends at the center of the wheel and at their outer ends at the four corners of the wheel as clearly disclosed in Figure 3. Intermediate the corners of this wheel, the periphery thereof is of rounded formation so as to receive the periphery of the annulus 18. Furthermore, the front face of the worm wheel 15 is equipped adjacent its edge with a pin 24 for the purpose of engaging within one of the slots of the star wheel at each revolution of said gear. Obviously the cut out 19 at the periphery of the annulus is to permit the corners of the star wheel to pass said annulus, while the pin 24 is engaged within the adjacent slot of said star wheel. However, after the worm gear 15 has turned a sufficient degree to cause a one-quarter turn of the shaft 20, the pin will withdraw from the particular slot at which time the periphery of the annulus will engage the adjacent curved surface of the star wheel so as to lock the shaft 20 against further rotation until the pin 24 again engages therewith.

Projecting forwardly from the large circular plate 21 upon the forward end of the shaft 20 at four equally spaced points of the plate are horizontal bars 25. Pivotally supported upon the inner and outer end of each bar 25 is a depending link 26 between each pair of which is hung a wire mesh food receiving basket 27 the same being hung between these links in an offcenter manner as clearly disclosed in Figure 1. Each basket is equipped at its forward side with a lug 28 directly in front of the foremost link 26, while interconnecting the foremost link and the basket at points beyond the lugs 28 are retractile coil springs 29, said springs being for the purpose of preventing the tilting of the baskets, while said lugs 28 will strike against the links 26 to limit the reverse swinging movement of the baskets beyond the horizontal position.

Within the casing 5 directly between the cooked food receiving receptacle 7 and the oil or water trough 8 and at a point slightly thereabove is a trip pin 30 for the purpose of engaging the nose of each basket 27 as the same passes therebeyond to cause the tilting of the basket to such an extent that the food therein will be dumped into the receptacle 7 in an obvious manner.

The shaft 20 is equipped with a sprocket gear 31 at a point between the plate 21 and said star wheel 22, this gear being provided for the purpose hereinafter more fully described.

The invention further consists of means for conveying properly the food to be cooked to the various baskets 27 as the same move into proper position and in sequence. This mechanism consists of a circular casing 32 within which is a rotary drum 33 formed at four equally spaced points with radiating food compartments 34 that are open at their outer ends. The bottom of the casing 32 is formed with an opening 35 so as to permit the food to be discharged from the various compartments as the same pass into registration therewith at which time one of the baskets 27 will be directly thereunder to catch the food flowing therefrom.

Upon the top side of the casing 32 is a suitable food hopper 36 for the purpose of supplying the food to the various compartments 34 of the drum 33.

Figure 1:
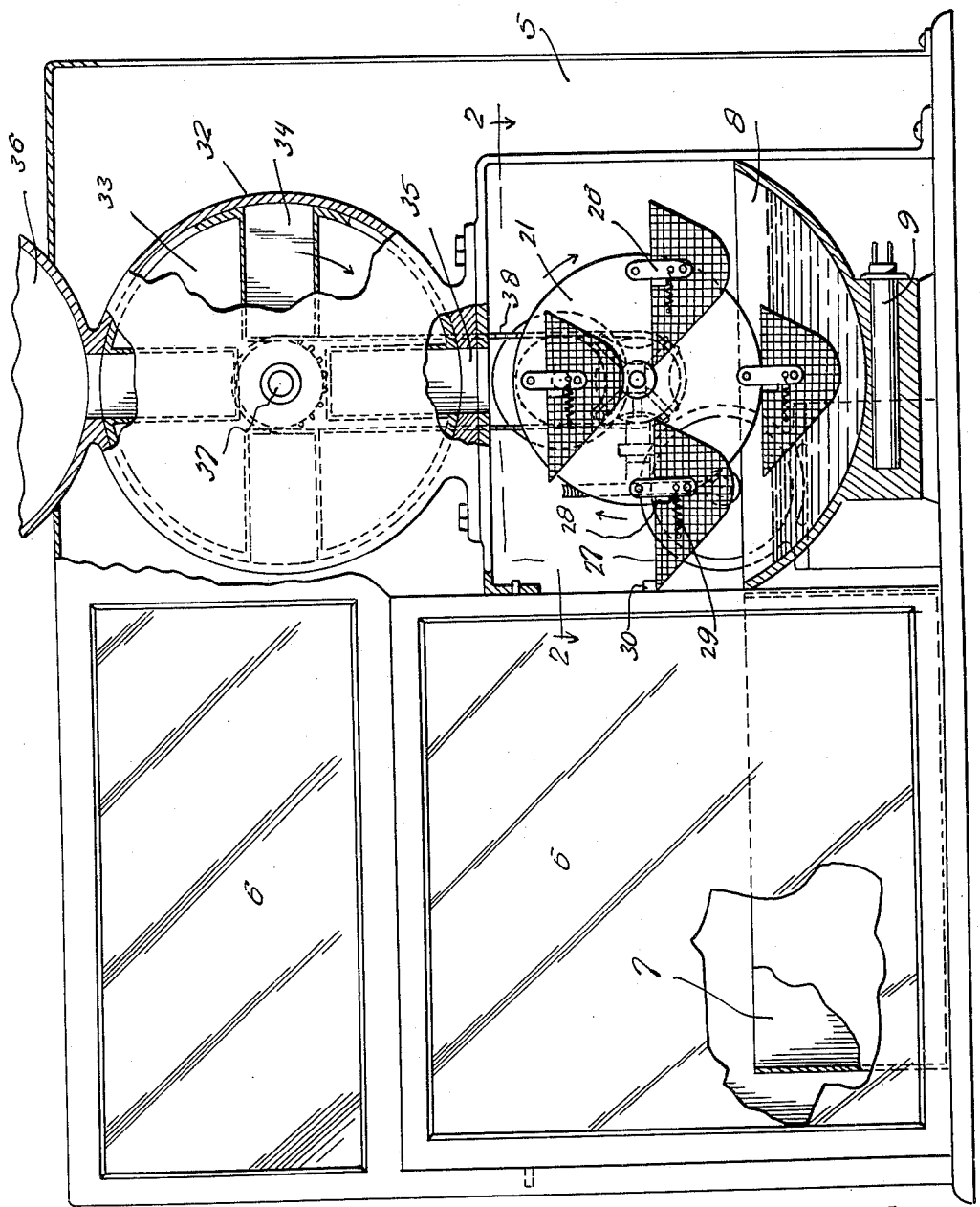
Figure 1 is a view in front elevation of a cooking device constructed in accordance with the present invention, a portion of the casing front wall being broken away, and the cooking mechanism per se being disclosed in front side elevation and partly in cross section.
Figure 2:
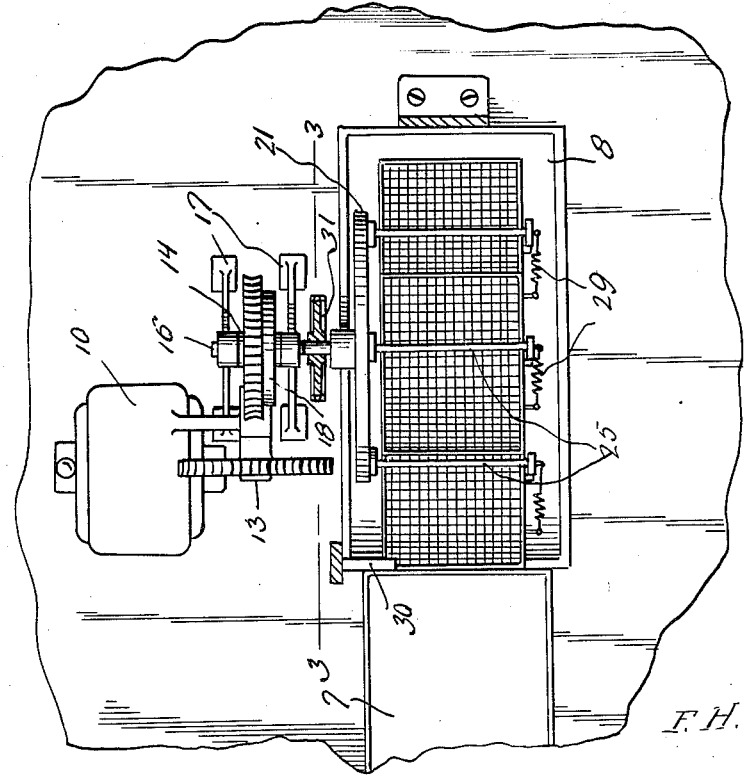
Figure 2 is a horizontal sectional view taken substantially upon the line 2—2 of Figure 1, and looking downwardly in the direction of the arrows for disclosing certain of the portions of the cooking mechanism per se in top plan and cross section.

Obviously the drum 33 is mounted upon a central shaft 37, the rear end of which is equipped with a suitable sprocket gear as indicated by the dotted lines in Figure 1, which sprocket gear is in vertical alignment with the sprocket gear 31 upon the shaft 20 and over which is trained an endless sprocket chain 38, Obviously the driving mechanism for the basket carrying plate 21 is such that the baskets 27 will be successively moved into the grease or water trough 8 and held therein for a predetermined length of time, dependent upon the ratio of the various gears heretofore described. Simultaneously with the actuation of said basket carrying annulus, the food distributing drum 33 will also be rotated so that the food will be carried from the hopper 36 into the uppermost basket 27 and this simultaneously with the entrance of the first mentioned basket into the trough 8.

It will thus be seen that I have provided a highly novel, simple, and efficient cooking device that is well adapted for all the purposes heretofore designated and even though I have herein shown and described the invention as consisting of certain detail structural elements, it is nevertheless to be understood that minor changes may be made therein without affecting the spirit and scope of the appended claims.

Having thus described the invention, what I claim is:—

1. In a cooking device of the character described, a trough for the cooking fluid, a plurality of circularly spaced metallic baskets mounted for rotation above the trough and which are adapted to be unitarily submerged in the fluid within the trough, means whereby the baskets are unitarily moved into the trough and permitted to remain therein for a predetermined length of time, and means for positively locking all the baskets against movement while a single basket is within the trough for its predetermined length of time.

2. In a cooking device of the class described, a trough for a cooking fluid, a rotary plate mounted in position above the trough, a plurality of circularly spaced material receiving baskets suspended from the face of the plate and adapted to be unitarily moved into the cooking fluid trough, means for normally preventing the swinging of the baskets, said means being operable to permit the tilting of the basket to facilitate the dumping thereof at a predetermined time, and additional means for locking the plate against rotation while said basket is submerged in the trough for its predetermined length of time.

3. In a cooking device of the class described, a trough for a cooking liquid, a pair of vertically spaced rotatable shafts, a basket carrying unit secured on the lower shaft, a plurality of baskets suspended therefrom, said baskets adapted to be unitarily moved into the trough and permitted to remain therein for a predetermined length of time, and cooperating means arranged on the shaft for positively locking the unit against movement while a single basket is within the trough for its predetermined length of time.

4. In a cooking device of the class described, a trough for a cooking liquid, a pair of vertically spaced rotatable shafts, a basket carrying unit secured on the lower shaft, a plurality of baskets suspended therefrom, said baskets adapted to be unitarily moved into the trough and permitted to remain therein for a predetermined length of time, and cooperating means arranged on the shaft for positively locking the unit against movement while a single basket is within the trough for its predetermined length of time, said means comprising a driven gear keyed on the upper shaft, a relatively small annulus on the outer face of the gear, said annulus being cut out at its peripheral portion, a star wheel secured on the lower shaft, the arms of the star wheel being slotted, and a pin projecting laterally from the gear and successively engaging the slotted arms of said star wheel, said star wheel being movable when one arm is disposed within the cut-out portion of the annulus.

5. In a cooking device of the class described, a trough for the cooking liquid, a rotatable shaft, arranged above the trough, a relatively large plate secured on the shaft for rotation therewith, a plurality of bars extending outwardly from the outer face of the plate at predetermined points, a pair of links pivotally supported upon the inner and outer end of each bar and depending therefrom, a food receiving basket pivotally suspended between the lower ends of each pair of depending links, said basket adapted to be unitarily moved into the cooking fluid trough, and means for normally preventing the swinging of the basket, said means being operable to permit the tilting movement of the basket to facilitate the dumping thereof.

6. In a cooking device of the class described, a trough for the cooking liquid, a rotatable shaft, arranged above the trough, a relatively large plate secured on the shaft for rotation therewith, a plurality of bars extending outwardly from the outer face of the plate at predetermined points, a pair of links pivotally supported upon the inner and outer end of each bar and depending therefrom, a food receiving basket pivotally suspended between the lower ends of each pair of depending links, said basket adapted to be unitarily moved into the cooking fluid trough, and means for normally preventing the swinging of the basket, said means being operable to permit the tilting movement of the basket to facilitate the dumping thereof, said last mentioned means comprising a lug carried by each basket and adapted to engage with the outermost link of each pair of basket suspension links, and retractile coil springs connecting the outermost link of each pair with the basket at a point beyond the lugs.

In testimony whereof I affix my signature.

FREDERICK HOBSON SMITH.